United States Patent [19]

Hirama

[11] 4,111,311
[45] Sep. 5, 1978

[54] MATERIAL HANDLING UNIT
[75] Inventor: Hideo Hirama, Tokyo, Japan
[73] Assignee: Kabushiki Kaisha Daini Seikosha, Japan
[21] Appl. No.: 724,313
[22] Filed: Sep. 17, 1976
[30] Foreign Application Priority Data
Sep. 17, 1975 [JP] Japan .................. 50-127771
[51] Int. Cl.² ........................................ B25J 9/00
[52] U.S. Cl. .............................. 214/1 BC; 92/12; 92/85 B; 188/319; 214/1 BB
[58] Field of Search ............. 214/1 BB, 1 BC, 1 BD, 214/1 BT, 1 BH, 1 BV; 188/312, 319; 92/10, 11, 12, 85 B

[56] References Cited
U.S. PATENT DOCUMENTS

| 2,788,842 | 4/1957 | Ohlenkamp | 188/319 X |
| 3,819,061 | 6/1974 | Andersson | 214/1 BB |
| 3,870,164 | 3/1975 | Haase | 214/1 BC X |

FOREIGN PATENT DOCUMENTS

| 1,386,244 | 12/1964 | France | 188/319 |
| 1,212,586 | 11/1970 | United Kingdom | 92/12 |

Primary Examiner—Drayton E. Hoffman
Assistant Examiner—George F. Abraham
Attorney, Agent, or Firm—Robert E. Burns; Emmanuel J. Lobato; Bruce L. Adams

[57] ABSTRACT

A material handling unit for moving material from one position to another comprises a gripper arm on a shaft which is movable critically by fluid pressure and is rotatable by a rack and pinion mechanism actuated by a cylinder and piston. Adjustable abutments are provided for limiting the range of movement of the arm. Dashpot means for applying a damping force to the manipulator so as to decelerate it before it reaches the limit of its movement is adjustable both as to the range of action and the rate of deceleration.

4 Claims, 4 Drawing Figures

MATERIAL HANDLING UNIT

FIELD OF INVENTION

The invention relates to a material handling unit comprising a movable manipulator for gripping the material and moving it from one position to another. In particular the invention relates to apparatus for transferring workpieces from a chucking position to a loading position for machines.

BACKGROUND OF INVENTION

A type of material handling units useful for transferring workpieces from a chucking position to a loading position for a machine has a swinging arm or manipulator provided at its outer end with means for gripping the workpiece. In a material handling unit of this kind relatively high positioning accuracy is required at the chucking position where the swing motion starts and at the loading position where it ends.

Such positioning is commonly carried out by engagement of a striking face of the swinger arm against a fixed abutment mounted on the frame of the material handling unit. In this manner high positioning accuracy is attained in comparison with a mechanical cam or electric positioning device and moreover repeatable accuracy and reliability are extremely high.

However when positioning the swinger arm by engagement with an abutment especially when the speed of the swinging motion of the swing arm is increased and the cycle time is reduced the swing arm may bounce or vibrate by reason of the impact shock in accordance with the weight of the payload. When such bouncing or vibration occurs the desired high positional accuracy and reliable motion cannot be attained.

SUMMARY OF INVENTION

It is an object of the present invention to eliminate the above-mentioned disadvantages and drawbacks and to provide a convenient and high performance material handling unit. In accordance with the invention the swing arm as it approaches the limit of its movement is decelerated by a dashpot mechanism so that the impact shock of the arm hitting the limiting abutment is lessened and the bounce or vibration of the swing arm is avoided. The performance of the material handling unit is further improved by providing means for adjusting the braking force and operating range of the dashpot so as to attain high performance without the disadvantages of shock and vibration.

BRIEF DESCRIPTION OF DRAWINGS

The nature objects and advantages of the invention will be more fully understood from the following description of a preferred embodiment shown by way of example in the accompanying drawings in which.

DESCRIPTION OF PREFERRED EMBODIMENT

Figure 1:
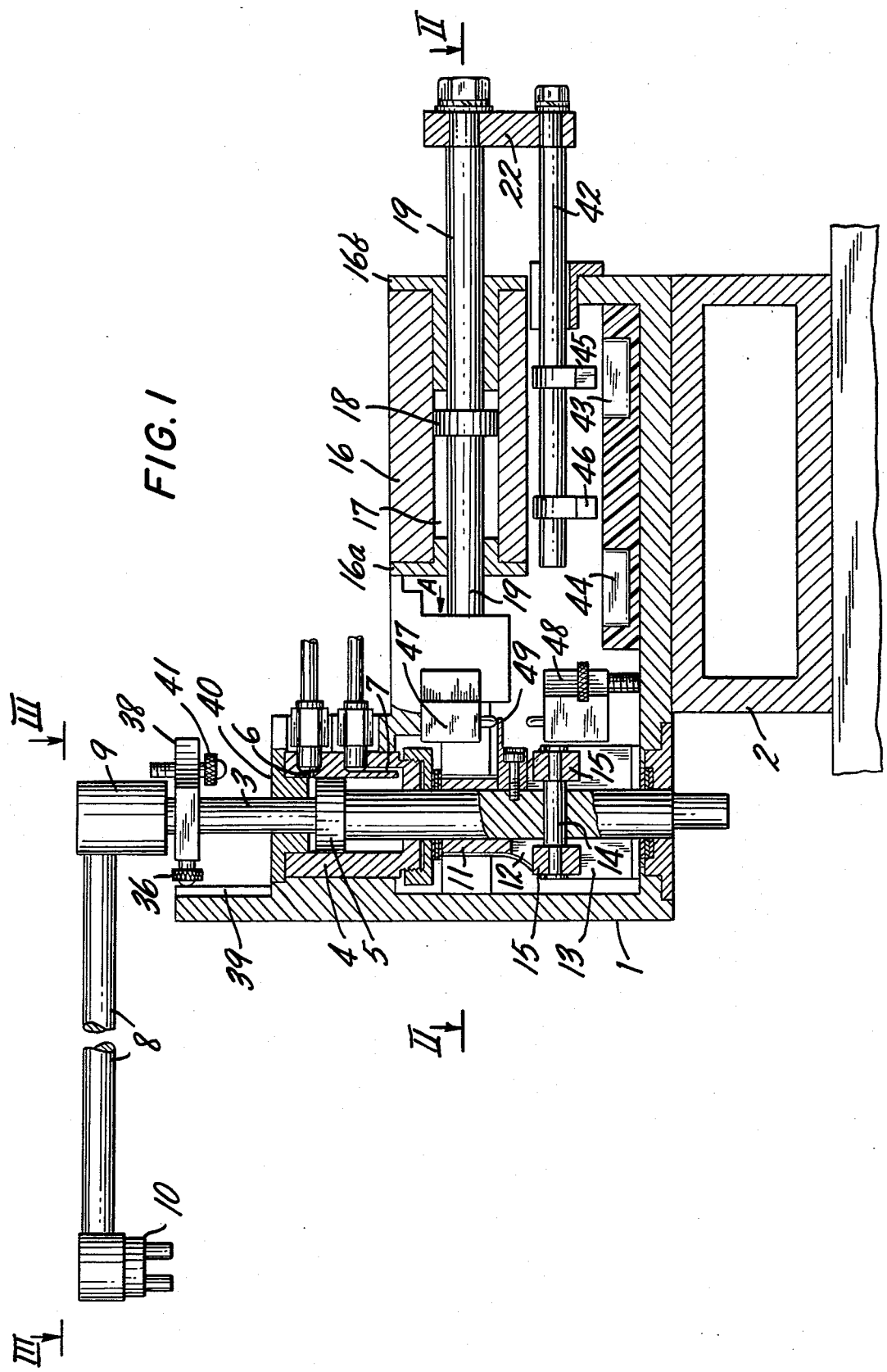
FIG. 1 is a vertical section view of a material handling unit in accordance with the invention.

The material handling unit in accordance with the invention as illustrated by way of example in the drawings has a box-type frame 1 which is removably fixed on a base 2. A movable column 3 extends through an air cylinder 4 mounted in the frame 1 and is supported for movement in a vertical direction and also rotatably in the frame 1. The movable column 3 has an annular piston 5 within the chamber of the air cylinder 4 so as to be moved upward and downward. The air cylinder 4 has air inlets 6 and 7 at opposite ends for actuating the piston 5.

A horizontal swing arm 8 is mounted on a head 9 at the upper end of the movable column 3. At its free end the swing arm 8 has a mechanical gripper 10 for picking up workpieces.

A pinion 11 is located between the air cylinder 4 and the bottom of the fixed frame 1 and surrounds the movable column 3. The pinion 11 is rotatable in the frame but is not movable vertically. A lower boss portion 12 of the pinion 11 has a longitudinal groove 13 which receives rollers 15 freely rotatable on opposite ends of a connecting pin 14 which extends diametrically through the movable column 3. Consequently rotation of the pinion is transmitted to the column 3 through the rollers 15 and pin 14 but the column 3 is free to move vertically with respect to the pinion 11.

Rotation of the column 3 to swing the arm 8 from one position to another is effected by a cylinder and piston mechanism comprising a cylinder 16 mounted on the fixed frame 1 at one side of the column 3 and a piston 8 reciprocable in the cylinder chamber 17. The piston 18 has a double-ended piston rod 19 which extends through cylinder heads 16a and 16b at opposite ends of the cylinder. One end of the piston rod 19 extends toward the movable column 3 and is formed with a rack 20 which meshes with the pinion 11 surrounding the column 3. Thus movement of the piston in the cylinder produces rotation of the pinion 11 and hence of the column 3 which carries the swinger arm 8. The other end of the piston rod 19 extends beyond the piston head 16b and is secured to a connecting plate 22 by which the piston rod is connected to a dashpot arrangement which will now be described.

Figure 2:
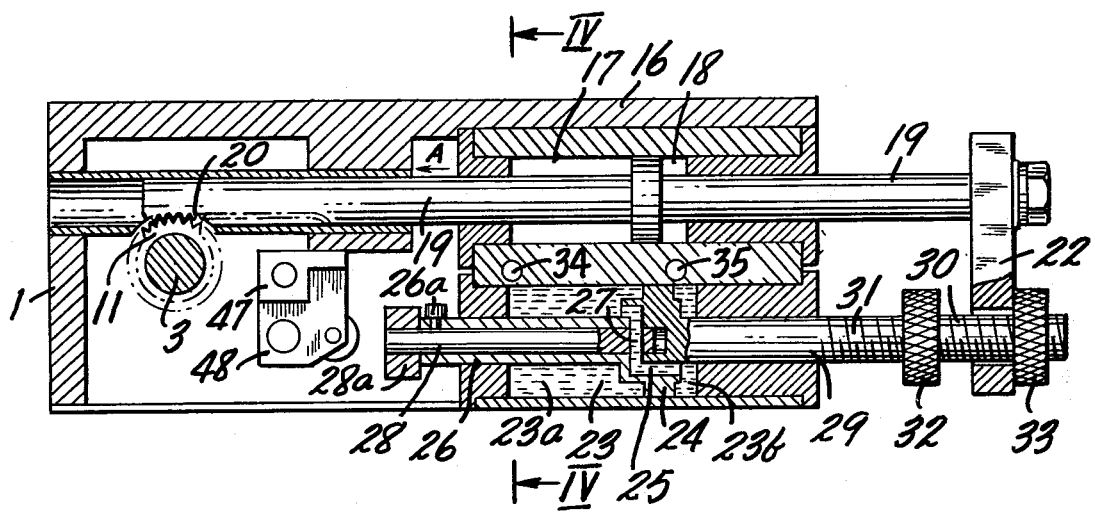
FIG. 2 is a horizontal sectional view taken approximately on the line II—II in FIG. 1.
Figure 4:
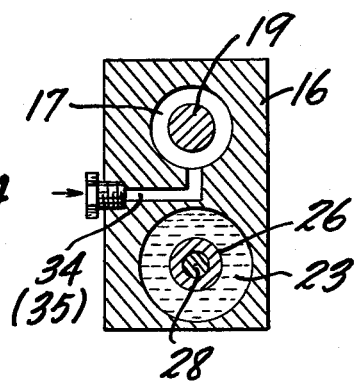
FIG. 4 is a sectional view taken approximately on the line IV—IV of FIG. 2.

As illustrated in FIGS. 2 and 4 dashpot arrangement comprises a hydraulic cylinder 23 which is parallel to the cylinder 16 and piston rod 19. The hydraulic cylinder 23 is filled with suitable oil and is completely sealed. A double-sided piston 24 in the cylinder 23 divides the cylinder into two variable chambers 23a and 23b. In the piston 24 there is provided a Z-shaped passageway 25 which connects the chambers 23a and 23b. The piston 24 has two piston rods 26 and 29 extending in opposite directions from the piston. The piston rod 26 extends through the cylinder head at one end of the cylinder 23 and has an axial bore in which an orifice adjusting rod 28 is freely rotatably inserted. The orifice adjusting rod 28 has an oil passage 27 which connects to portions of the orifice passage 25. The orifice passage can thus be regulated by rotational adjustment of the orifice adjusting rod 28. At its outer end the orifice adjusting rod 28 is provided with a knob 28a. A set screw 26a is screwed into a tapped radial hole in the piston rod 26 and can be tightened to hold the orifice adjusting rod 28 in adjusted position.

The other piston rod 29 of the piston 23 extends through the cylinder head at the opposite end of the cylinder 23 and is provided at its outer end with a threaded portion 31 which extends loosely through a hole 30 in the connecting plate 22 secured to the projecting end of the piston 19 of the piston 18 in the cylinder 16. Two nuts 32 and 33 are screwed onto the threaded portion 31 of the piston rod 29 on opposite sides of the connecting plate 22. The nuts 32 and 33 are normally adjusted so that the distance between them is greater than the thickness of the connecting plate 22. There is thus provided a lost motion connection between the piston rod 19 of the piston 18 and the piston rod 29 of the piston 24.

The cylinder casing 16 is provided at opposite ends with air inlets 34 and 35 for admitting air to the cylinder 16 so as to operate the piston 14. The air inlets 34 and 35 are located between the cylinder chamber 17 and the hydraulic cylinder 23 so as to be in heat-conducting relationship with the hydraulic cylinder for a purpose that will be described below.

Figure 3:
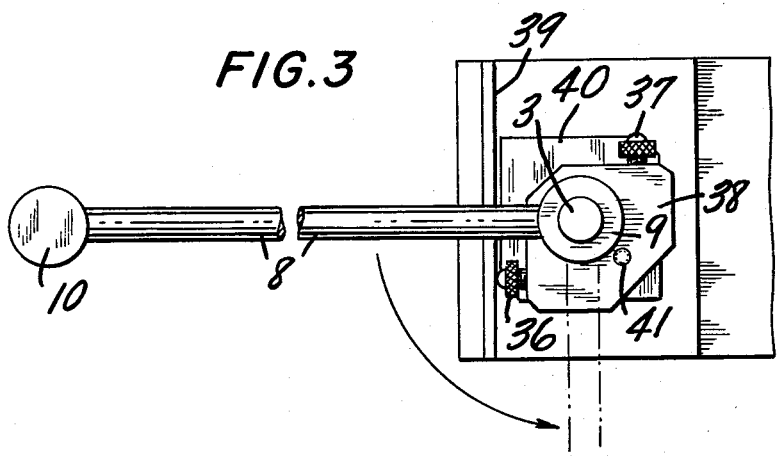
FIG. 3 is a partial plan view taken in the direction indicated by the lines III—III in FIG. 1.

Referring now to FIGS. 1 and 3 it will be seen that adjustable positioning pins 36 and 37 are provided on a holder plate 38 fixed on the upper portion of the movable column 3. The positioning pins 36 and 37 are located at an angle corresponding to the predetermined swing angle of the swinger arm 8. The positioning pin 36 hits a positioning plate 39 mounted on the fixed frame 1 to fix the starting position of the swinger arm 8 while the positioning pin 37 hits the positioning plate 39 to fix the ending position of the swinger arm 8. In addition an adjustable positioning pin 41 is provided on the lower face of the holder plate 38 and is engageable with an abutment face 40 on the fixed frame 1 to fix the lower position of the swing arm 8.

A supporting rod 42 one end of which is fixed on the connecting plate 22 extends parallel to the piston rod 19 of the driving rod 18 and carries two permanent magnets 45 and 46 which are spaced apart at a predetermined interval. The permanent magnets 45 and 46 face contactless switches 43 and 44 which control valves (not shown) controlling air inlets 34 and 35 to the driving cylinder chamber 17. When the swing arm 8 approaches the starter position of its swing the magnet 45 approaches the contactless switch 43 to turn it ON and thereby stop the retracting motion of the piston 18. The other magnet 46 approaches the contactless switch 44 to turn it ON in order to stop the advancing motion of the piston 18 when the swing arm 8 approaches the end position of its swing.

Contact switches 47 and 48 are mounted on the fixed frame 1 so as to be turned ON or OFF by a contact plate 49 carried by the movable column 3. The contact switches 47 and 48 control valves (not shown) controlling admission of air to the cylinder 4 for moving the movable column 3 up or down. The switch 47 is turned ON when the swinger arm 8 reaches its upper position while the switch 48 is turned ON when the arm 8 reaches its lower position.

The present invention will be more fully understood from the following description of operation of the material handling unit.

Starting with the swing arm 8 and its lifted position and with the mechanical gripper 10 over the chucking position for workpieces compressed air is supplied from the air inlet 6 to the air cylinder 4 so as to move the piston 5 downwardly. The movable column 3 is thereby moved downwardly together with the swing arm 8 until the positioning pin 41 engages the stopper plate 40. Thus the mechanical gripper 10 comes to the chucking position. Simultaneously the contact plate 49 on movable column 3 engages the contact switch 48 to turn it ON and thereby stop downward movement of the piston 5.

After the mechanical gripper 10 grips a workpiece (not shown) in the chucking position compressed air is supplied to the air cylinder 4 to the air inlet 7. The movable column 3 is consequently moved upward by the piston 5 to raise the swing arm 8 to its former position. Simultaneously the contact plate 49 on the movable column 3 engages contact switch 47 to switch it to ON position to stop the operation of the air cylinder 4.

Next, compressed air is applied to the air cylinder 17 through the air inlet 35 to advance the piston 18 in the direction of the arrow A. The rack 20 of the piston rod 19 meshes with the pinion 11 to rotate the movable column 3 in a counterclockwise direction and thereby swing the swing arm 8 toward the loading position of the machine.

When the swing arm 8 comes close to the loading position the connecting plate 22 which is fixed on a projecting end portion of the piston rod 19 comes into engagement with the nut 32 on piston rod 31 of the piston 24 in hydraulic cylinder 23. Further movement of the connecting plate 22 towards the left as viewed in FIG. 2 causes the piston 24 to move towards the left in the cylinder 23. This movement of the piston 24 causes the oil in the hydraulic cylinder chamber 23a to flow through the orifice passage 25 into the hydraulic cylinder chamber 23b thereby creating a pressure difference acting on the piston. This pressure difference causes the piston 24 to act as a brake on the advance of the piston 18 in the air cylinder 17. The rate of advance of the piston 18 is consequently decreased so that the swinger arm is decelerated. The swing arm 8 turns further at the damp rate until the positioning pin 37 engages the positioning plate 39.

Simultaneously when the swinging motion of the swing arm 8 is stopped by the positioning plate 39 the magnet 46 faces the contactless switch 40 to turn it ON. The air supply to the air cylinder 17 is thereby stopped and the mechanical gripper 10 on the swing arm 8 is stopped over the loading position of the machine.

The air cylinder 4 is then again operated so as to move the swing 8 together with the movable column 3 downwardly. The workpiece held by the mechanical gripper 10 is thereby loaded on the machine.

After the workpiece is loaded on the machine and the swinger arm has been returned to its upper position by the air cylinder 4 compressed air is supplied to the air cylinder 17 through the air inlet 34 to move the piston 18 toward the right as viewed in FIGS. 1 and 2. The movable column 3 is accordingly rotated clockwise so as to swing the swinger arm 8 toward the chucking position. When the swing arm approaches the chucking position the connecting plate 22 engages nut 33 on the piston rod 31 of the piston 24 in the hydraulic cylinder 23. Further movement of the piston 18 and connecting plate toward the right causes the piston 24 to move towards the right in the hydraulic cylinder. The hydraulic fluid is accordingly caused to flow from the chambers 13b through the orifice passage 25 to the chamber 23a. Thus a braking force is exerted on the piston 18 so as to decrease the speed of the piston in the manner described above. The swing arm 8 continues its return movement at a damped speed until the positioning pin 36 engages the positioning plate 39 to stop the motion. At this time the magnet 45 faces the contactless switch 43 to turn it ON and thereby stop the supply of air to the air cylinder 17. The mechanical gripper 10 is thereby returned to the chucking position and the cycle described above is repeated.

For controlling the speed of the swinging movement of the swinger arm 8 and for adjusting the braking force of the daspot in accordance with variation of the payload the cross-sectional area of the orifice passage 25 may be adjusted by rotating the orifice adjusting rod 28 so as to restrict the orifice passage 25 to a greater or less extent. In addition, for adjusting the operating range of the dashpot, nuts 32 and 33 may be moved longitudinally on the threaded portion 31 of the piston rod 29 so as to adjust the position in which they are engaged by the connecting plate 22.

The oil filling the hydraulic cylinder 23 of the dashpot is cooled by the air supplied through the inlets 34 and 35 to the cylinder chamber 17 owing to the cooling of the air by adiabatic expansion. Therefore the oil is not heated and its viscosity is not changed so that the braking force of the dashpot is stable during a long period of operation of the material handling unit.

As will appear from the foregoing description the material handling unit of the present invention includes a dashpot connected with the driving mechanism for the swinging motion of the swing arm. Therefore bounce or vibration of the swing arm by reason of the impact shock at the end of the swing motion is eliminated and accordingly a smooth and reliable handling motion can be attained. Furthermore the brake force and the operating range of the dashpot can be adjusted in accordance with the payload and in addition the speed of the swinging motion of the swing arm can also be controlled. As a result a material handling unit of high speed high accuracy and high payload capacity is realized.

While a preferred embodiment of the invention has been illustrated in the drawings and is herein particularly described it will be understood that many variations and modifications can be made and that the invention is hence in no way limited to the illustrated embodiments.

What I claim is:

1. A material handling unit comprising a movable manipulator for gripping the material and moving it from one position to another, a driving cylinder and a piston reciprocable in said cylinder for driving said manipulator and having a piston rod extending from said cylinder, abutment means for setting the limits of movement of said manipulator, single dashpot means for applying a damping force to said manipulator to decelerate said manipulator before it reaches the limits of its movement, said dashpot means comprising a dashpot cylinder disposed parallel to said working cylinder and having cylinder heads at opposite ends thereof, hydraulic fluid filling said dashpot cylinder and sealed therein, a piston reciprocable in said dashpot cylinder, first and second piston rods of like diameter extending in opposite directions from said piston and through said cylinder heads respectively, spaced abutments adjustably fixed on said first piston rod outside said dashpot cylinder, a connecting member on said piston rod of said driving cylinder engageable with said spaced abutments for adjusting the operating range of said dashpot means to determine the range of movement of said manipulator in which said damping force is applied, said piston of said dashpot cylinder having a passage extending from one side to the other side thereof, valve means in said passage for adjustably restricting said passage and means extending through said second piston rod for controlling said valve means to adjust the damping force applied to said manipulator by said dashpot means.

2. A material handling unit according to claim 1 in which said passage through said piston of said dashpot cylinder is Z-shaped with openings at opposite faces of said piston disposed at opposite sides of the longitudinal axis of said dashpot cylinder, said passage thereby crossing said axis, and in which said valve means is disposed axially of said piston and said control means comprises a control rod extending axially of said second piston rod from said valve means to an outer end of said second piston rod.

3. A material handling unit according to claim 2 in which said valve means comprises an integral inner end portion of said control rod disposed in said passage so as variably to restrict said passage.

4. A material handling unit according to claim 1 in which said driving cylinder is air-operated, and in which air inlets for said driving cylinder are disposed between said driving cylinder and dashpot cylinder and in heat conducting relation with said dashpot cylinder whereby heat is removed from said dashpot cylinder and the hydraulic fluid sealed therein by the cooling effect of the adiabatic expansion of air at said air inlets.

* * * * *